July 22, 1952  D. H. MENZEL  2,604,601
PHOTOELECTRIC CENTERING DEVICE
Filed July 17, 1947
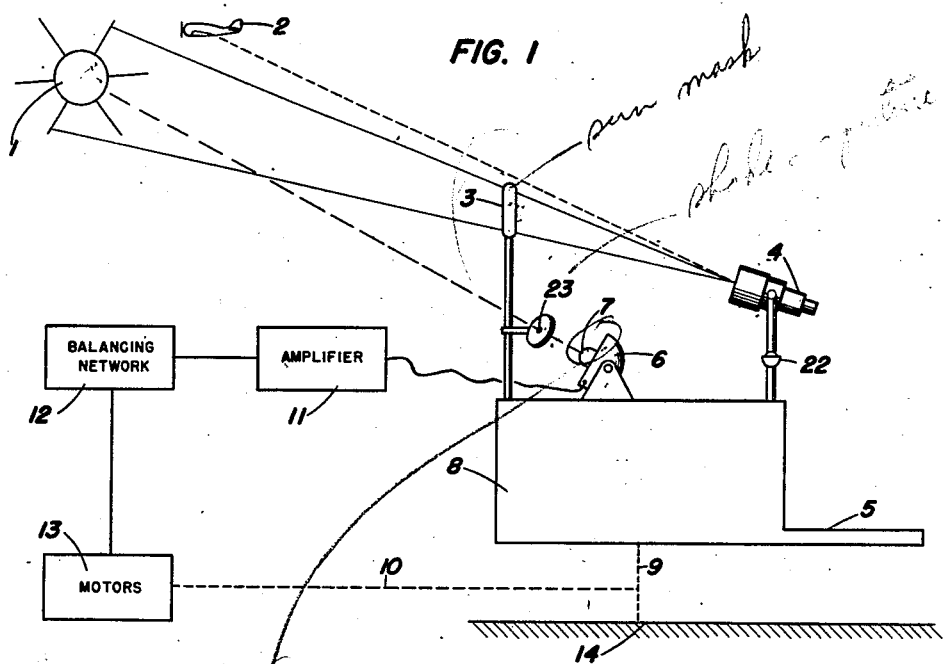
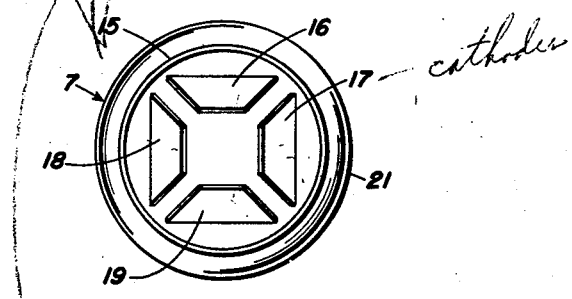
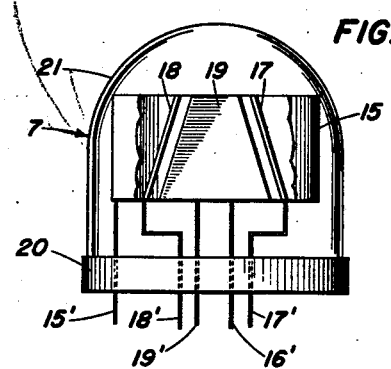
INVENTOR
DONALD H. MENZEL
BY
ATTORNEY Patented July 22, 1952

2,604,601

UNITED STATES PATENT OFFICE 2,604,601

PHOTOELECTRIC CENTERING DEVICE

Donald H. Menzel, Cambridge, Mass., assignor to the United States of America as represented by the Secretary of the Navy Application July 17, 1947, Serial No. 761,649

1 Claim. (Cl. 313—96)

This invention relates in general to photoelectric tubes and more particularly to a multicathode photoelectric tube for controlling the motion of a structure in accordance with the motion of a light beam.

One form of multi-cathode photoelectric tube of the prior art is the photoelectric multiplier. In this tube the cathodes are arranged to multiply the electron stream, thus increasing the output of the tube as compared to the output of the conventional single cathode tube.

Applicant was working upon the problem of spotting aircraft flying in the vicinity of the sun, where the question arose to control the observer so that no matter when and where he looked the sun was always obscured by a masking disc. It was found desirable to accomplish the control electrically. And a search of the prior art showed that there were no suitable photo electric tubes available for this purpose, those that were responsive to a moving light beam were not sensitive and did not have the required output.

Applicant discovered that by using photoelectric tubes having the cathode inclined to the incident light beam, he was able to produce a controlling device that was very sensitive to the motion of the incident light beam and that had sufficient output to be practicable.

Accordingly, it is an object of this invention to provide a more sensitive photoelectric device for determining the relative movement between a light source and said photoelectric device.

Another object is to provide a more sensitive photoelectric device as to direction of movement and intensity of response between a light source and said device.

Another object is to provide a photoelectric device that will be economical to manufacture, reliable in operation and which possesses all of the qualities of ruggedness and dependability in service.

Fig. 1 is a diagrammatic sketch of one type of apparatus in which this invention may be used;

Fig. 2 is a plan view of the invention; and

Fig. 3 is an elevational view of this invention, a portion of the anode being broken away.

The apparatus of this invention has a number of practical uses, in fact it may be used in most cases where it is desired to control some device by the movement of a light beam. For the purposes of this invention the use in searching for aircraft in the vicinity of the sun will be described in detail, together with a clear and concise description of the apparatus of this invention.

Fig. 1 illustrates apparatus where an observer stands on platform 5 and searches a certain designated area of the sky through binoculars 4 mounted upon stand 8 through universal joint 22. When the designated area of the sky is in the vicinity of the sun 1 the searcher's vision will be impaired by the rays of the sun. If it is possible to keep the sun continuously masked, the searcher can with a fair degree of effectiveness complete his search in the vicinity of the sun. It will now be shown how this is possible.

On stand 8 is mounted the photoelectric tube 7 in an adjustable housing 6 so that it may be adjusted to receive a beam of light symmetrically along the axis of the tube through aperture 23 when mask 3 just covers the sun as viewed in binoculars 4. As the sun progresses across the sky the mask 3 appears moved from its masking position, and the light beam through aperture 23 moves away from its symmetrical location about the longitudinal axis of the photoelectric tube 7. The moving of the beam of light on the photo electric tube causes current to flow in its circuits proportionally to the movement of the beam. These currents are amplified in amplifier 11 and passed on to balancing network 12 where suitable currents to operate motors 13 are derived. Motors 13 move stand 8 through shafts 10 and 9 in train and elevation with respect to ground 14 until mask 3 again covers the sun in binoculars 4 and the light beam through aperture 23 is again symmetrical about the longitudinal axis of photoelectric tube 7. In this manner the photoelectric tube 7 of this invention operates to maintain mask 3 over the sun as viewed in binoculars 4.

The novel structure of photoelectric tube 7 is illustrated in Figs. 2 and 3. In the initial tests of this apparatus disclosed in Fig. 1, applicant used four conventional photocells having parallel anodes and cathodes in a symmetrical group for the impingement of the light beam through aperture 23. This arrangement of conventional photocells was not sensitive enough either in regard to intensity of the currents produced or the direction. The conventional photocells were modified by inclining the cathodes. Applicant discovered by virtue of this modification of cathodes, that the intensity of the currents produced by the photocells was greatly increased for small movements of the light beam as compared to that produced by the previously tried cathodes. Since four photocells were awkward to handle, applicant incorporated the four inclined cathodes symmetrically into a multi-circuit photocell, shown in Figures 2 and 3. He discovered that this arrangement of the cathodes gave a greatly improved response to the direction of movement of the light beam.

The grouping of the cathodes as shown in Figures 2 and 3 is the result of the grouping of the individual photocells in the initial tests. If, before the cathodes were inclined, they were placed in one envelope, they would form a box like structure open at the bottom and top with enough spacing at the corners for insulating purposes. Obviously there must be a spacing at the corners for insulating purposes in order to keep the circuits separate. When it was discovered that the inclined cathode gave the unexpected results, this inclination of the grouped cathodes 16, 17, 18, and 19 forms a pyramid structure, open at the corners for insulating purposes, and with the apex portion cut off some convenient distance from the apex, to give a reasonable length to the structure of the envelope of the tube. The cutting off of the apex portion is an expedient for optimum length of the envelope and it obviously permits maximum cathode area for any particular length of envelope.

Since the cathode is the active electrode of the photocell, the anode for the multi-cathode photocell may be made in a single unit, surrounding the group of cathodes as illustrated at 15 in Figs. 2 and 3.

In operation, the aperture 23 of Fig. 1 forms a spot of light, which may be projected upon a screen for diffusion purposes before permitting the light to fall upon cathode group 16—19, or may be projected directly upon the cathode group. Obviously, there is an optimum size of spot of light for the best or most efficient operation. If the spot of light is too large the directional response will be diminished and if the spot of light is too small the tube will not function properly either as to intensity or direction. The size of the spot of light is adjusted to give maximum intensity for good directional response characteristics to a movement of the light beam.

I claim:

A photoelectric tube comprising an envelope, an anode and a plurality of cathodes symmetrically arranged about and inclined toward a centrally disposed axis for increasing the intensity and the directional response of a moving light beam on said photoelectric tube, said cathodes having similarly tapered sides tapering toward said axis and the cathodes being relatively closely spaced with the side edges of adjacent cathodes lying along parallel lines.

DONALD H. MENZEL.

REFERENCES CITED

The following references are of record in the file of this patent:

UNITED STATES PATENTS

| Number | Name | Date |
|---|---|---|
| 1,999,646 | Wittkuhns | Apr. 30, 1935 |
| 2,128,104 | Thomas | Aug. 23, 1938 |
| 2,421,192 | Engstrom | May 27, 1947 |